METHOD AND APPARATUS FOR HOLDING PATTERNS ON A SURFACE

Filed April 8, 1969

INVENTORS.
Hugo E. Kranz
Kenneth R. Kranz

BY Schmidt, Johnson, Hovey, Williams & Chase.
ATTORNEYS.

United States Patent Office 3,512,487
Patented May 19, 1970

3,512,487

METHOD AND APPARATUS FOR HOLDING PATTERNS ON A SURFACE

Hugo E. Kranz, Overland Park, and Kenneth R. Kranz, Mission, Kans., assignors to Replica Associates, Inc., Kansas City, Mo., a corporation of New York Continuation-in-part of application Ser. No. 669,440, Sept. 2, 1967. This application Apr. 8, 1969, Ser. No. 814,308
Int. Cl. A47b 13/00
U.S. Cl. 108—23 8 Claims

ABSTRACT OF THE DISCLOSURE

Apparatus for holding patterns on a lay marker table so that the patterns will be held absolutely flat and immobile with respect to the surface of the table for accurate reproduction on a piece of sensitized copy material, the apparatus including a pair of opposed sheets of material overlying the surface of the table, the patterns and the copy material being positioned between the sheets, the sheets being suitably sealed about the edges thereof to present an airtight enclosure, and means for withdrawing air from the enclosure to thereby flatten said sheets and therefore said patterns and said copy material with respect to said surface. The method of holding the patterns on the surface by use of said apparatus includes the steps of placing a first sheet of material on the surface; positioning the patterns on the first sheet of material; placing a second sheet over the patterns; sealing the edges of the sheets together; and withdrawing air from between the sheets whereby to cause the same to flatten the patterns with respect to the suface and thereby immobilize the same against movement.

CROSS REFERENCES

This application is a continuation-in-part of application Ser. No. 669,440, filed Sept. 2, 1967, now U.S. Pat. No. 3,446,162 and entitled "Photo Lay Marker Table."

It is the primary object of this invention to provide a method and apparatus for holding patterns with respect to the surface of a lay marker table whereby said patterns will be retained in an absolutely flat condition and against movement or slippage, to the end that the patterns may be accurately reproduced upon a piece of sensitized copy material through the operation of the photo lay marker table.

The most important aim of this invention is to provide apparatus for holding patterns and at least one sheet of sensitized copy material with respect to the surface of a lay marker table, which apparatus includes a pair of opposed sheets of material overlying a surface of the marker table, there being means sealing the marginal edges of said sheets of material together whereby to present an airtight enclosure, the patterns and copy material being positioned within said enclosure; and means for withdrawing air from the enclosure to thereby bring the patterns and the copy material into intimate contact over a large area between the sheets and retain the same against movement, thereby precluding any possible undercutting of the image.

It is a particular object of this invention to provide apparatus for holding patterns and at least one piece of sensitized copy material with respect to a lay marker table, which lay marker table has a flat sheet of transparent material with a pair of opposed surfaces, one of the surfaces being supported by a plurality of light tubes, the other surface having the patterns positioned with respect thereto and having indicia thereupon whereby to aid in the positioning of the patterns, the apparatus for holding the patterns and copy material including a pair of opposed sheets of transparent material overlying the other surface of the lay marker table, the marginal edges of said sheets overlying a metal rail of a frame which surrounds the transparent sheet of material of the lay marker table, there being a plurality of lengths of magnetic tape overlying the marginal edges of the opposed sheets of material whereby to seal the edges between the tape and the rail to thus create an airtight enclosure within which the patterns and copy material are positioned, the patterns being held in a flat, fixed position when the air is withdrawn from the enclosure.

It is a further aim of this invention to provide apparatus for holding patterns which is economical in cost and convenient in operation in that the material comprising the same are lightweight, easily handled, and can be readily rolled into position for operation from any side of the lay marker table inasmuch as all parts are accessible from any location about the table. Further, operation is fast and accurate inasmuch as the space to be evacuated is small, due to the nature of the materials defining the space, and the manner in which the components are relatively positioned permits absolutely accurate reproduction without any chance for slippage or elongation.

Other objects of this invention include the method by which the patterns are held with respect to the surface of the lay marker table and additional details of construction of the apparatus which will become apparent from the following specification and accompanying drawing, wherein.

Figure 1:
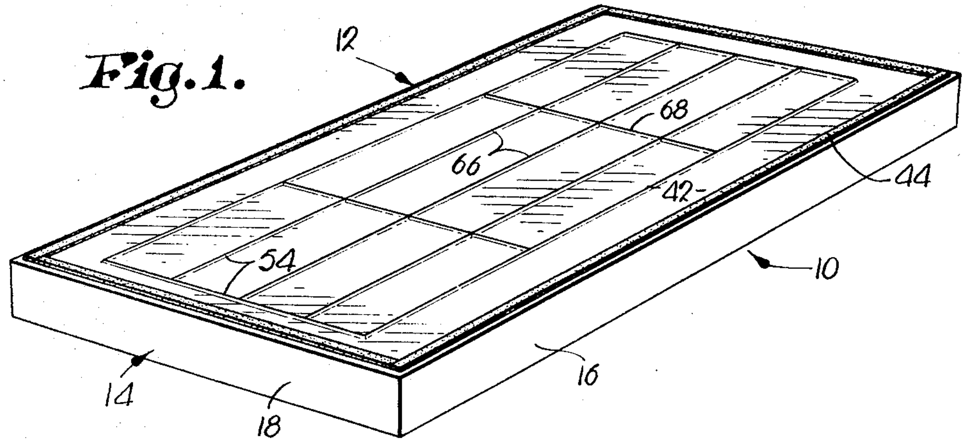
FIG. 1 is a perspective view of the top of a lay marker table showing the apparatus in place thereon.
Figure 2:
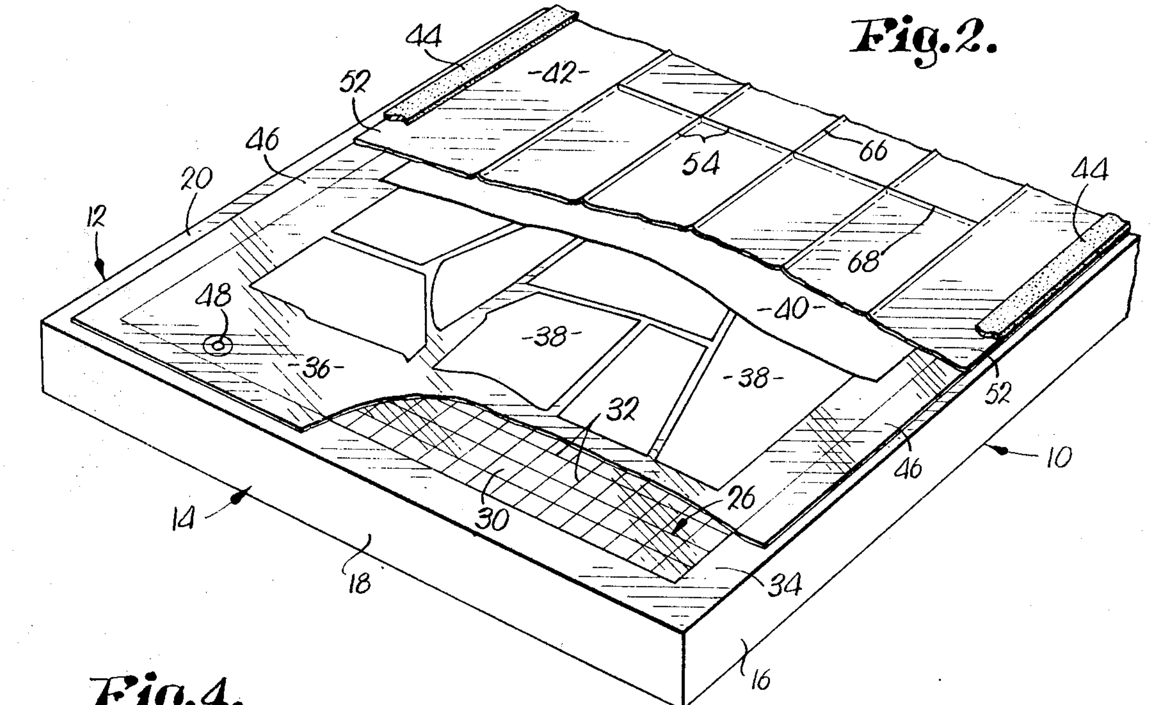
FIG. 2 is an enlarged, fragmentary, perspective view of the top of a lay marker table showing the components of the apparatus for holding the patterns in place thereupon.
Figure 4:
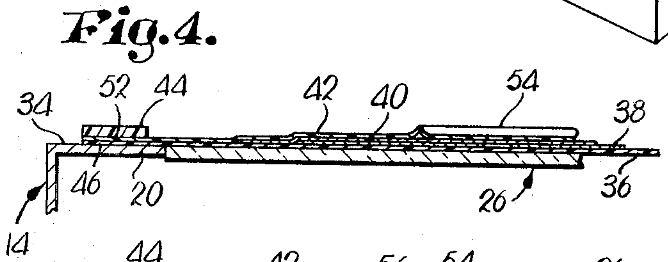
FIG. 4 is a fragmentary, sectional view of the table showing the apparatus thereupon and with the patterns between the sheets.

A photo lay marker table, broadly designated by the numeral 10 and of the type disclosed in application Ser. No. 669,440, is provided with a top 12 having suitable supporting structure whereby to position the top 12 at a convenient and comfortable working level, the lay marker table being used in reproducing patterns or copies used in various industries by reproducing an image of the original patterns upon a suitable piece of sensitized copy material. While the term "patterns" is generally used hereinafter to designate the article to be reproduced in the particular embodiment of the invention chosen for illustration, said term is not to be considered a limiting, but rather as encompassing any comparable physical article capable of reproduction by the method and apparatus hereinafter described.

The top 12 of the table 10 is defined by a frame 14 which is preferably formed of metal, the frame presenting a pair of opposed sidewalls 16 and a pair of end walls 18, said walls normally being vertically disposed as illustrated in the drawing. The frame 14 also includes a horizontally positioned rail 20 which extends inwardly in a horizontal plane from the upper edge of the walls 16 and 18, said rail 20 being of metal in the embodiment of the invention chosen for illustration.

The frame 14 contains a plurality of aligned light tubes 22 which span the distance between sidewalls 16 thereof, said light tubes 22 being in closely spaced relationship throughout the length of the table 10 with the opposite ends thereof each being carried by a suitable support such as 24.

The light tubes 22 cooperate to support a flat sheet of transparent material 26 which fills the area between the rail 20 and thereby defines the working area of the photo lay marker table top 12. The sheet 26 is normally formed of glass or a suitable transparent plastic material whereby light from the tubes 22 may freely pass therethrough.

Sheet 26 has a pair of opposed surfaces, there being one surface 28 which is in contact with the tubes 22, the other surface 30 of sheet 26 having suitable indicia 32 thereupon whereby to aid in the use of the lay marker table 10 in a manner which will be hereinafter described. In the embodiment chosen for illustration, indicia 32 consists of a plurality of longitudinal and transverse grid lines which cover the entire surface 30 at predetermined intervals whereby to permit exact positioning of the patterns as the same are placed with respect to the top 12 of the table 10. The other surface 30 of the flat sheet of transparent material 26 is in substantial alignment with the upper surface 34 of the circumscribing rail 20 whereby to present an essentially flat surface for the entire top 12 of table 10.

The apparatus for holding the patterns with respect to the surface 30 of table 10 includes a first transparent, relatively flexible sheet of material 36 overlying the sheet 26 and a portion of the rail 20; a plurality of original patterns 38 overlying the sheet 36; at least one piece of sensitized copy material 40 in overlying relationship to the patterns 38; and a second transparent, relatively flexible sheet of material 42 overlying the piece of copy material 40, the patterns 38 and the sheet 36. Said apparatus also includes means such as a plurality of lengths of magnetic tape 44 for sealing together the marginal edges of the opposed sheets 36 and 42 and a device, in the nature of a pump, for withdrawing the air from between the sheets 36 and 42 once the edges have been sealed together whereby to flatten said sheets together and thereby holding the patterns 38 in a fixed position and in an absolutely flat condition.

The first sheet of material 36 is transparent in nature whereby to permit light from tubes 22 to pass therethrough and thereby project onto the copy material 40, the image of the patterns 38, whereby to reproduce said patterns for subsequent additional utilization.

The sheet 36 may be of any suitable material although "Mylar" has been found to be a preferred material which is easily handled and can be readily positioned in overlying relationship to the surface 30 of sheet 26 and upper surface 34 of the rail 20. It is important that the marginal edges such as 46 of the sheet 36 have at least some portion thereof in overlying relationship to the surface 34 of metal rail 20.

First sheet 36 has an air outlet 48 formed therethrough, said air outlet being in communication with a tube 50, which, in turn, is in communication with a vacuum pump which may be ultimately utilized to withdraw the air from the enclosure defined when sheets 36 and 42 are positioned in overlying relationship and the edges thereof sealed together.

Once sheet 36 has been positioned on the top 12 of table 10, the patterns 38 are positioned thereon in their specific desired relationship, such relationship being readily determinable inasmuch as sheet 36 is transparent whereby the indicia 32 may be utilized to accurately position the patterns 38.

Once the patterns 38 have been positioned, a sheet of sensitized copy material 40 is rolled out over the patterns 38, the sensitized image receiving face of sheet 40 being adjacent said patterns. The second sheet 42 is then positioned in overlying relationship to patterns 38 and copy material 40, it being noted that the marginal edge 52 of sheet 42 is in overlying relationship to the marginal edge 46 of sheet 36 and also the surface 34 of metal rail 20.

Sheet 42 is formed in such a manner as to define a plurality of ridges 54, the ridges 54 defining channels 56 which are in communication with one another and with the air outlet 48 whereby air may be readily and rapidly withdrawn from the limited space between the sheets 36 and 42 once the same have been sealed together to present an airtight enclosure.

The sealing of the sheets whereby to define the airtight enclosure is accomplished by utilizing the lengths of magnetic tape 44 and positioning the same over the marginal edges 46 and 52 of the sheets 36 and 42 respectively, whereby, upon attraction of the lengths 44 to the metal rail 20 and, more particularly, the surface 34 thereof, a tight seal between said lengths 44 and surface 34 is created to thereby seal marginal edges 46 and 52 together. The lengths of magnetic tape 44 are placed entirely about the top 12 of table 10 in the manner shown in FIG. 1 of the drawing whereby a completely sealed enclosure is presented prior to actuation of the vacuum pump to withdraw the air from between the sheets 36 and 42. It will be appreciated that two opposed strips of magnetic tape might be used as an alternate method of sealingly clamping the marginal edges 46 and 52 of sheets 36 and 42 together to create the enclosure, particularly if mobility of the enclosure was desired or if a metal surface such as 34 was unavailable.

When the pump is actuated the air trapped between the sheets 36 and 42 will pass along the channels 56 defined by ridges 54 and thence out of the enclosure whereby to draw sheet 42 tightly against copy material 40, patterns 38 and sheet 36 and thus insure that patterns 38 are held in an absolutely flat condition, the holding of such patterns being assured by the pressure exerted thereupon by the overlying sheet 42 when air is evacuated from between said sheet and the underlying sheet 36.

Once the patterns are in a flat position, the lay marker table is operated whereby to actuate tubes 22 and thereby project light through sheet 36 and onto the sensitized material 40, the patterns thus being reproduced in image upon the material 40. Subsequent to such utilization the seal between the sheets 36 and 42 is broken as by removing a length of tape 44 and the sheet 42 and material 40 may be individually and easily rolled to remove the same from the top 12 of the table 10. Patterns 38 can then be removed and, if desired, sheet 36 may be rolled and removed. However, it would be appropriate to leave sheet 36 in place upon surface 30 of sheet of material 26 for subsequent utilization of the table 10.

Figure 5:
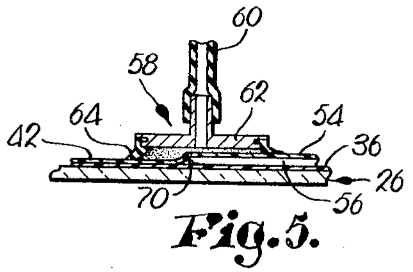
FIG. 5 is an enlarged, fragmentary, sectional view showing a modified form of air outlet formed in one of the sheets.
Figure 3:
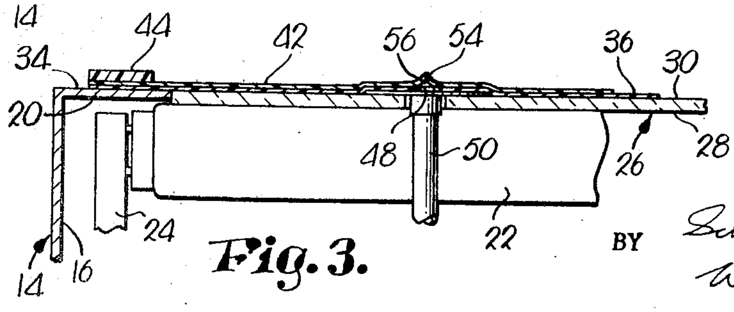
FIG. 3 is an enlarged, cross-sectional view of one corner of the lay marker table showing the apparatus in position thereon.

FIG. 5 of the drawing illustrates an alternate method of attaching the vacuum pump to the enclosure defined by the sheets 36 and 42 when the same are in overlying relationship. Specifically, this device comprises a suction cup 58 which is in communication with the vacuum pump through a tube 60, the cup having a plate 62 and a depending circumscribing skirt 64, the cup 58 being positionable atop the sheet 42 at the junction of a longitudinal ridge 66 and a transverse ridge such as 68 whereby to fit said cup with respect to sheet 42, there being an opening such as 70 provided through the sheet 42 whereby air may be withdrawn from between the sheets 36 and 42 by the alternate type of device 58.

It will be appreciated that the apparatus described above might include only a single sheet of material positioned in overlying relationship to surface 30 of sheet 26 and the space between such sheet of material and surface 30 evacuated, as by coupling a pump with the space between sheet 26 and surface 30 or by placing said space in communication with the interior of the table and evacuating the space and the interior, whereby the patterns, which would be positioned between said single sheet of material and surface 30, would be drawn tightly against surface 30 and be flattened and held against movement.

Having thus described the invention, what is claimed as new and desired to be secured by Letters Patent is:

1. Apparatus for holding patterns on a surface comprising:

a pair of opposed sheets of material overlying said surface, the patterns being between said sheets;
means sealing the edges of said sheets together whereby to present an airtight enclosure; and
means for withdrawing air from the enclosure to there-flatten said patterns between said sheets.

2. Apparatus as set forth in claim 1, the sheet proximal to said surface being sufficiently transparent to permit light to pass ttherethrough.

3. Apparatus as set forth in claim 2, the other of said sheets having a plurality of ridges formed therein whereby to define channels for directing the flow of air between said sheets when the air is being withdrawn.

4. Apparatus as set forth in claim 3, there being an air outlet formed in one of said sheets and in communication with said channels and a vacuum pump coupled with said outlet for withdrawing air from the enclosure.

5. Apparatus as set forth in claim 4, said means for sealing the edges of the sheets including a metal rail in contact with the marginal edges of said proximal sheet and magnetic tape in contact with the marginal edges of said other sheet, said tape and said rail sealing said edges therebetween.

6. In combination with a lay marker table having a flat sheet of transparent material with a pair of opposed surfaces, one of said surfaces being in contact with a plurality of closely spaced, aligned light tubes whereby said tubes support said sheet, the other surface having patterns positioned with respect thereto, apparatus for holding the patterns in a fixed, flat position relative to said other surface comprising:

a pair of opposed sheets of material overlying said other surface, the patterns being positioned between said sheets;
means sealing the edges of said opposed sheets together whereby to present an airtight enclosure; and
means for withdrawing air from the enclosure to thereby flatten said patterns between said opposed sheets.

7. The invention as set forth in claim 6, there being a piece of sensitized copy material positioned over said patterns, the sheet proximal to said other surface being sufficiently transparent that light from said tubes may pass therethrough whereby to reproduce an image of said patterns on said piece of copy material.

8. The invention as set forth in claim 7, there being a frame supporting said flat sheet of transparent material, said frame having a metal rail substantially coplanar with said other surface, said pair of opposed sheets each having their marginal edges in overlying relationship to said rail, said sealing means being in the form of lengths of magnetic tape overlying said marginal edges whereby to seal said edges between said tape and said rail.

References Cited

UNITED STATES PATENTS

| | | | |
|---|---|---|---|
| 1,838,312 | 12/1931 | Kanult | 355—91 XR |
| 2,956,769 | 10/1960 | Sigler et al. | 248—363 |
| 3,232,202 | 2/1966 | Rice | 355—91 XR |
| 3,306,176 | 2/1967 | Myers | 355—91 |
| 3,368,471 | 2/1968 | Beato | 355—91 |
| 3,420,608 | 1/1969 | Canale | 355—91 |
| 3,446,162 | 5/1969 | Kranz | 108—23 |

BOBBY R. GAY, Primary Examiner

G. O. FINCH, Assistant Examiner

U.S. Cl. X.R.

108—50; 355—91; 248—363